United States Patent
Lee

(10) Patent No.: US 12,548,726 B2
(45) Date of Patent: Feb. 10, 2026

(54) CIRCUIT BREAKER TERMINAL BOX HAVING LEAKAGE CURRENT BLOCKING FUNCTION

(71) Applicant: VISION TECH Corporation, Busan (KR)

(72) Inventor: Ho Seok Lee, Busan (KR)

(73) Assignee: VISION TECH Corporation, Busan (KR)

( * ) Notice: Subject to any disclaimer, the term of this patent is extended or adjusted under 35 U.S.C. 154(b) by 177 days.

(21) Appl. No.: 18/224,478

(22) Filed: Jul. 20, 2023

(65) Prior Publication Data
US 2024/0290564 A1    Aug. 29, 2024

(30) Foreign Application Priority Data
Feb. 27, 2023   (KR) .................. 10-2023-0025886

(51) Int. Cl.
*H01H 83/02*   (2006.01)
*H01H 71/02*   (2006.01)
*H01H 71/08*   (2006.01)

(52) U.S. Cl.
CPC .......... *H01H 83/02* (2013.01); *H01H 71/025* (2013.01); *H01H 71/08* (2013.01)

(58) Field of Classification Search
CPC ...... H01H 71/025; H01H 71/08; H01H 83/02; H01H 71/02

USPC ......................................................... 200/237
See application file for complete search history.

(56) References Cited

U.S. PATENT DOCUMENTS

| 11,489,334 B2 | 11/2022 | Lee |
| 2023/0299513 A1 | 9/2023 | Lee |

FOREIGN PATENT DOCUMENTS

| KR | 10-1625493 B1 | 5/2016 |
| KR | 10-2022-0000630 A | 1/2022 |
| KR | 10-2022-0000631 A | 1/2022 |

OTHER PUBLICATIONS

Non-final office action mailed Oct. 28, 2024 from the Korean Patent Office for Korean Application No. 10-2023-0025886.

*Primary Examiner* — Anthony R Jimenez
(74) *Attorney, Agent, or Firm* — Insight Law Group, PLLC; Seung Lee

(57) ABSTRACT

The present disclosure relates to a circuit breaker terminal box having a leakage current blocking function, in which a current leaking from both an input side and an output side of an earth leakage circuit breaker may be limited by expanding areas of a neutral line input terminal and a neutral line output terminal on both the input side and the output side of the earth leakage circuit breaker, and thus the risk of electric shock to the human body due to the leakage current can be minimized.

5 Claims, 3 Drawing Sheets

CIRCUIT BREAKER TERMINAL BOX HAVING LEAKAGE CURRENT BLOCKING FUNCTION

CROSS-REFERENCE TO RELATED APPLICATION

This application claims priority to and the benefit of Korean Patent Application No. 10-2023-0025886 filed on Feb. 27, 2023, the disclosure of which is incorporated herein by reference in its entirety.

BACKGROUND

1. Field of the Invention

The present disclosure relates to a circuit breaker, and more particularly, to a circuit breaker terminal box having a leakage current blocking function.

2. Discussion of Related Art

Korean Patent Registration No. 10-1625493 (published on May 30, 2016) previously filed and registered by the applicant of the present disclosure discloses that a leakage current decreases as an area ratio difference between two flat conductors increases. This technology prevents electric shock by limiting the leakage current by using an area difference between conductor electrodes.

The present inventor has studied a technology capable of limiting a current leaking from both an input side and an output side of an earth leakage circuit breaker by expanding areas of a neutral line input terminal and a neutral line output terminal on both the input side and the output side of the earth leakage circuit breaker.

RELATED ART DOCUMENT

Patent Document

Korean Patent Registration No. 10-1625493 (published on May 30, 2016)

SUMMARY OF THE INVENTION

The present disclosure is directed to providing a circuit breaker terminal box having a leakage current blocking function, in which a current leaking from both an input side and an output side of an earth leakage circuit breaker may be limited by expanding areas of a neutral line input terminal and a neutral line output terminal on both the input side and the output side of the earth leakage circuit breaker.

A circuit breaker terminal box having a leakage current blocking function includes a neutral line input terminal area expansion unit that is in electrical contact with a neutral line input terminal on an input side of an earth leakage circuit breaker to expand an area of the neutral line input terminal on the input side of the earth leakage circuit breaker so as to limit a leakage current on the input side of the earth leakage circuit breaker, a neutral line output terminal area expansion unit that is in electrical contact with a neutral line output terminal on an output side of the earth leakage circuit breaker to expand an area of the neutral line output terminal on the output side of the earth leakage circuit breaker so as to limit a leakage current on the output side of the earth leakage circuit breaker, a lower housing in which internal components including the earth leakage circuit breaker, the neutral line input terminal area expansion unit, and the neutral line output terminal area expansion unit are accommodated, and an upper housing that is coupled to an upper portion of the lower housing, prevents the internal components accommodated inside the lower housing from being exposed to the outside to protect the internal components.

The circuit breaker terminal box may further include an input-side terminal block that electrically connects an input-side phase voltage line (R line or T line or S line) and a phase voltage line input terminal on the input side of the earth leakage circuit breaker and electrically connects an input-side neutral line (N line) and the neutral line input terminal on the input side of the earth leakage circuit breaker.

The circuit breaker terminal box may further include an input-side neutral line area expansion unit that limits a leakage current from the input-side terminal block by expanding an area of the input-side neutral line connected to the input-side terminal block.

The circuit breaker terminal box may further include an output side terminal block that electrically connects an output side phase voltage line (R line or T line or S line) and a phase voltage line output terminal on the output side of the earth leakage circuit breaker and electrically connect an output side neutral line (N line) and the neutral line output terminal on the output side of the earth leakage circuit breaker.

The circuit breaker terminal box may further include an output side neutral line area expansion unit that limits a leakage current from the output side terminal block by expanding an area of the output side neutral line connected to the output side terminal block.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
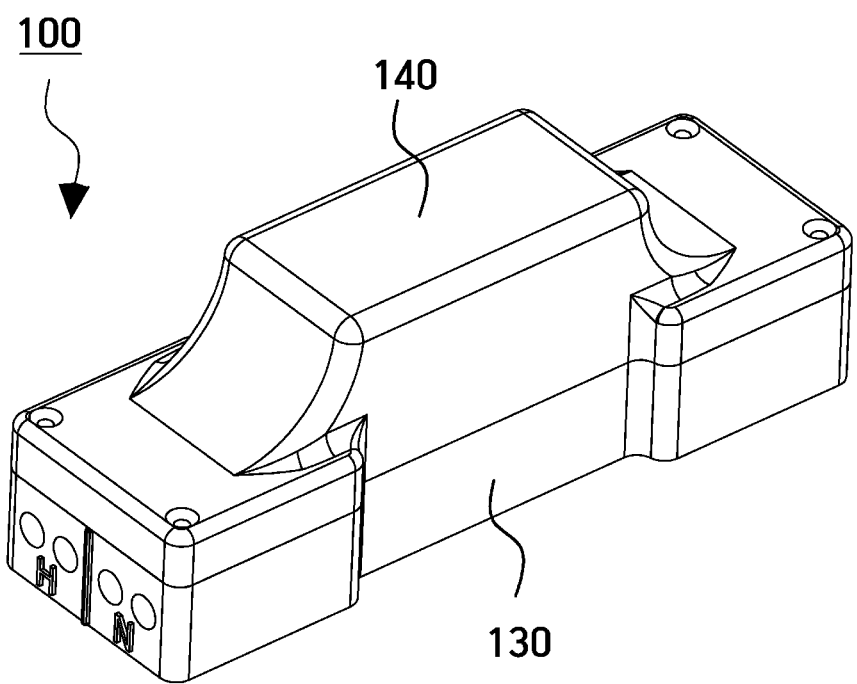
FIG. 1 is a perspective view illustrating an exterior of a configuration of a circuit breaker terminal box having a leakage current blocking function according to an embodiment of the present disclosure.

Hereinafter, the present disclosure will be described in detail so that those skilled in the art may easily understand and reproduce the present disclosure through exemplary embodiments described with reference to the accompanying drawings. Although specific embodiments are illustrated in the drawings and related detailed descriptions are made, the embodiments and descriptions are not intended to limit various embodiments of the present disclosure to any particular form.

In the description of the present disclosure, when it is determined that the detailed description of related widely known functions or configurations may make the subject matter of the embodiments of the present disclosure unclear, the detailed description will be omitted.

It should be understood that, when it is mentioned that a first component is "connected" or "coupled" to a second component, the first component may be directly connected or coupled to the second component, or a third component may be present between the first component and the second component.

On the other hand, it should be understood that, when a first component is "directly connected" or "directly coupled" to a second component, a third component is not present therebetween.

Figure 2:
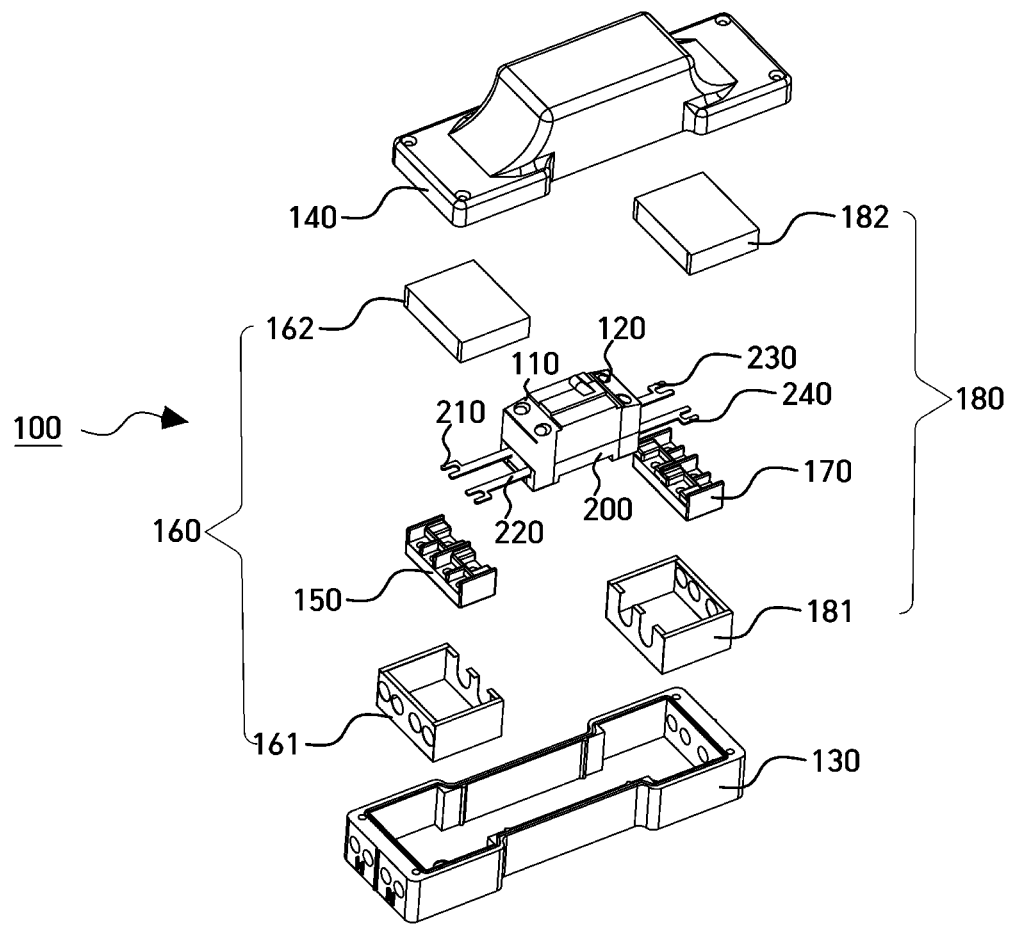
FIG. 2 is an exploded perspective view illustrating the configuration of the circuit breaker terminal box having a leakage current blocking function according to the embodiment of the present disclosure.
Figure 3:
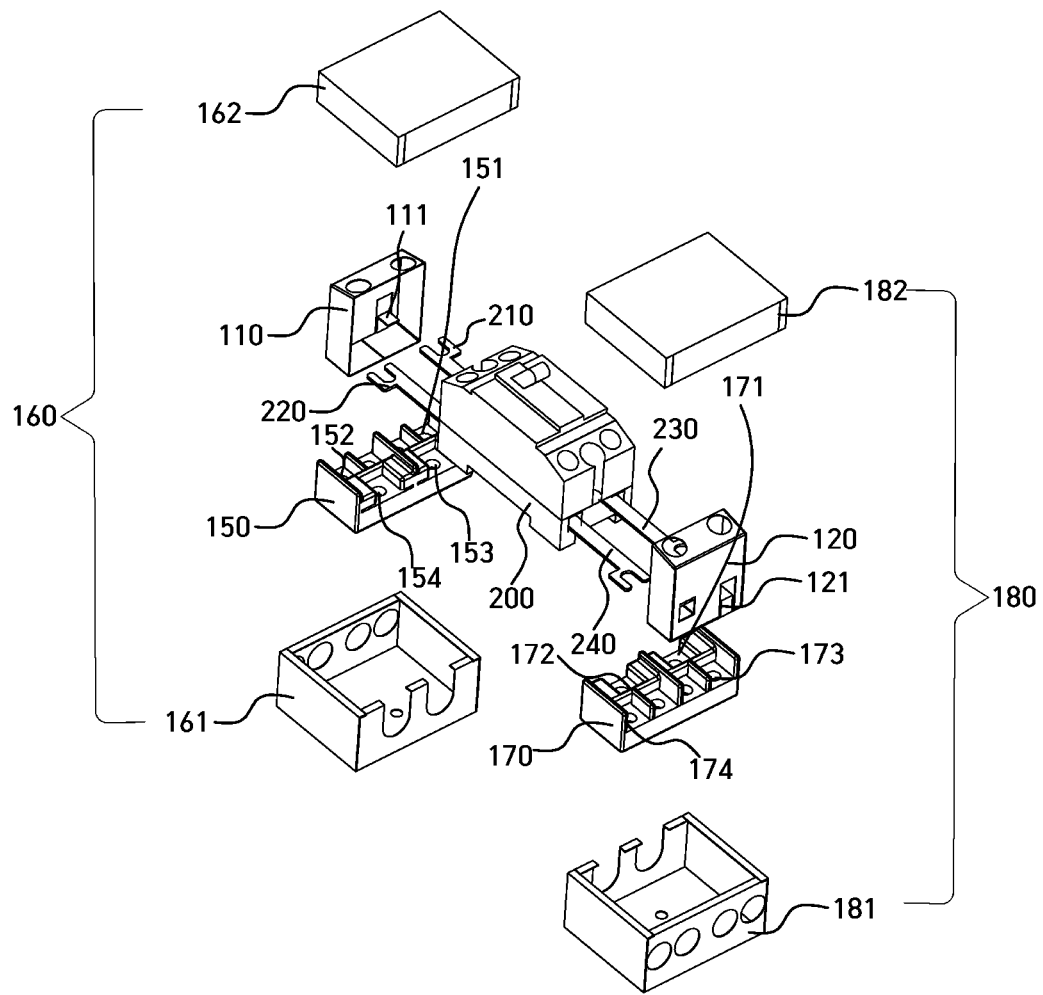
FIG. 3 is an exploded perspective view illustrating internal components of the circuit breaker terminal box having a leakage current blocking function according to the present disclosure.

FIG. 1 is a perspective view illustrating an exterior of a configuration of a circuit breaker terminal box having a leakage current blocking function according to an embodiment of the present disclosure, FIG. 2 is an exploded perspective view illustrating the configuration of the circuit breaker terminal box having a leakage current blocking function according to the embodiment of the present disclosure, and FIG. 3 is an exploded perspective view illustrating internal components of the circuit breaker terminal box having a leakage current blocking function according to the present disclosure.

As illustrated in FIGS. 1 to 3, a circuit breaker terminal box 100 having a leakage current blocking function according to an embodiment includes a neutral line input terminal area expansion unit 110 made of a conductive material, a neutral line output terminal area expansion unit 120 made of a conductive material, a lower housing 130 made of an insulating material, and an upper housing 140 made of an insulating material.

The neutral line input terminal area expansion unit 110 made of a conductive material is in electrical contact with a neutral line input terminal 210 on an input side of an earth leakage circuit breaker 200 to expand an area of the neutral line input terminal 210 on the input side of the earth leakage circuit breaker 200 so as to limit a leakage current on the input side of the earth leakage circuit breaker 200.

For example, since a connection part 111 formed at a specific portion of the neutral line input terminal area expansion unit 110 is designed to be in mechanical contact with the neutral line input terminal 210 on the input side of the earth leakage circuit breaker 200 and the neutral line input terminal area expansion unit 110 is in electrical contact with the neutral line input terminal 210 on the input side of the earth leakage circuit breaker 200, the area of the neutral line input terminal 210 may be expanded.

The area of the neutral line input terminal 210 on the input side of the earth leakage circuit breaker 200 becomes greater than a phase voltage line input terminal 220 due to the neutral line input terminal area expansion unit 110 made of a conductive material, and thus the leakage current becomes much smaller. Further, as the leakage current becomes smaller, the risk of electric shock becomes smaller, and thus the risk of electric shock to the human body due to the leakage current can be minimized.

The reason for this, as disclosed in Korean Patent Registration No. 10-1625493 (published on May 30, 2016), is that the leakage current gradually decreases as the area of the flat plate-shaped conductor (corresponding to the neutral line input terminal of the present disclosure) connected to a negative terminal becomes greater than an area of the flat plate-shaped conductor (corresponding to the phase voltage line input terminal of the present disclosure) connected to a positive terminal of a power source.

In detail, a closed loop is not normally configured in a portion where an area is expanded by the neutral line input terminal area expansion unit 110, but when the circuit breaker terminal box 100 having a leakage current blocking function is submerged in water due to flooding, the closed loop is configured.

When the circuit breaker terminal box 100 having a leakage current blocking function is submerged in water and thus the closed loop is configured, a current leaks through the phase voltage line input terminal 220 on the input side of the earth leakage circuit breaker 200, and the current flows through the phase voltage line input terminal 220 on the input side of the earth leakage circuit breaker 200, the water, the neutral line input terminal area expansion unit 110, and the neutral line input terminal 210 on the input side of the earth leakage circuit breaker 200 in this order.

In this process, the current leaking through the phase voltage line input terminal 220 on the input side of the earth leakage circuit breaker 200 does not flow to the human body having a relatively very large resistance but flows to the neutral line input terminal area expansion unit 110 through the water and is drawn into the neutral line input terminal 210 on the input side of the earth leakage circuit breaker 200. Thus, the flow of the leakage current to the human body is limited, and thus the risk of electric shock to the human body is minimized.

The neutral line output terminal area expansion unit 120 made of a conductive material is in electrical contact with a neutral line output terminal 230 on an output side of an earth leakage circuit breaker 200 to expand an area of the neutral line output terminal 230 on the output side of the earth leakage circuit breaker 200 so as to limit a leakage current on the output side of the earth leakage circuit breaker 200.

For example, since a connection part 121 formed at a specific portion of the neutral line output terminal area expansion unit 120 is designed to be in mechanical contact with the neutral line output terminal 230 on the output side of the earth leakage circuit breaker 200 and the neutral line output terminal area expansion unit 120 is in electrical contact with the neutral line output terminal 230 on the output side of the earth leakage circuit breaker 200, the area of the neutral line output terminal 230 may be expanded.

The area of the neutral line output terminal 230 on the output side of the earth leakage circuit breaker 200 becomes greater than a phase voltage line output terminal 240 due to the neutral line output terminal area expansion unit 120 made of a conductive material, and thus the leakage current becomes much smaller. Further, as the leakage current becomes smaller, the risk of electric shock becomes smaller, and thus the risk of electric shock to the human body due to the leakage current can be minimized.

The reason for this, as disclosed in Korean Patent Registration No. 10-1625493 (published on May 30, 2016), is that the leakage current gradually decreases as the area of the flat plate-shaped conductor (corresponding to the neutral line output terminal of the present disclosure) connected to a negative terminal becomes greater than an area of the flat plate-shaped conductor (corresponding to the phase voltage line output terminal of the present disclosure) connected to a positive terminal of a power source.

In detail, a closed loop is not normally configured in a portion where an area is expanded by the neutral line output terminal area expansion unit 120, but when the circuit breaker terminal box 100 having a leakage current blocking function is submerged in water due to flooding, the closed loop is configured.

When the circuit breaker terminal box 100 having a leakage current blocking function is submerged in water and thus the closed loop is configured, the current leaks through the phase voltage line output terminal 240 on the output side of the earth leakage circuit breaker 200, and the current flows through the phase voltage line output terminal 240 on the output side of the earth leakage circuit breaker 200, the water, the neutral line output terminal area expansion unit 120, and the neutral line output terminal 230 on the output side of the earth leakage circuit breaker 200 in this order.

In this process, the current leaking through the phase voltage line output terminal 240 on the output side of the earth leakage circuit breaker 200 does not flow to the human body having a relatively very large resistance but flows to the neutral line output terminal area expansion unit 120 through the water and is drawn into the neutral line output terminal 230 on the output side of the earth leakage circuit breaker 200. Thus, the flow of the leakage current to the human body is limited, and thus the risk of electric shock to the human body is minimized.

Internal components including the earth leakage circuit breaker 200, the neutral line input terminal area expansion unit 110, and the neutral line output terminal area expansion unit 120 are accommodated inside the lower housing 130 made of an insulating material.

The upper housing 140 made of an insulating material is coupled to an upper portion of the lower housing 130 using a screw coupling method or the like to prevent the internal components accommodated inside the lower housing 130 from being exposed to the outside to protect the internal components.

Meanwhile, a waterproof structure such as rubber packing is provided along an outer periphery of the upper portion of the lower housing 130 made of an insulating material, to which the upper housing 140 made of an insulating material is coupled, and thus even when the circuit breaker terminal box 100 is submerged in water in a state in which the upper housing 140 made of an insulating material is coupled to the upper portion of the lower housing 130 made of an insulating material, the water does not flow into the circuit breaker terminal box 100.

Even when the circuit breaker terminal box 100 is submerged in water and the water flows thereinto in a state in which the upper housing 140 made of an insulating material is coupled to the upper portion of the lower housing 130 made of an insulating material, an area of the neutral line input terminal 210 on the input side of the earth leakage circuit breaker 200 and an area of the neutral line output terminal 230 on the output side of the earth leakage circuit breaker 200 are respectively expanded by the neutral line input terminal area expansion unit 110 and the neutral line output terminal area expansion unit 120, and thus a current leaked through the phase voltage line input terminal 220 on the input side of the earth leakage circuit breaker 200 and the phase voltage line output terminal 240 on the output side of the earth leakage circuit breaker 200 is limited.

By this implementation, according to the present disclosure, the current leaking from both the input side and the output side of the earth leakage circuit breaker 200 may be limited by expanding areas of the neutral line input terminal 210 and the neutral line output terminal 230 on both the input side and the output side of the earth leakage circuit breaker 200. Thus, the risk of electric shock to the human body due to the leakage current can be minimized.

Meanwhile, according to an additional aspect of the present disclosure, the circuit breaker terminal box 100 having a leakage current blocking function may further include an input-side terminal block 150. The input-side terminal block 150 electrically connects an input-side phase voltage line (R line or T line or S line) (not illustrated) and the phase voltage line input terminal 220 on the input side of the earth leakage circuit breaker 200 and electrically connects an input-side neutral line (N line) (not illustrated) and the neutral line input terminal 210 on the input side of the earth leakage circuit breaker 200.

For example, an input-side neutral line connection part 151 made of a conductive material and an input-side phase voltage line connection part 152 made of a conductive material are provided on one side of the input-side terminal block 150, and a neutral line input terminal connection part 153 made of a conductive material and a phase voltage line input terminal connection part 154 made of a conductive material are provided on the other side of the input-side terminal block 150. Thus, an input-side neutral line may be electrically connected to the input-side neutral line connection part 151, an input-side phase voltage line may be electrically connected to the input-side phase voltage line connection part 152, the neutral line input terminal 210 may be electrically connected to the neutral line input terminal connection part 153, and the phase voltage line input terminal 220 may be electrically connected to the phase voltage line input terminal connection part 154.

In this case, the circuit breaker terminal box 100 having a leakage current blocking function may further include an input-side neutral line area expansion unit 160 made of a conductive material. The input-side neutral line area expansion unit 160 limits a leakage current of the input-side terminal block 150 by expanding an area of the input-side neutral line connected to the input-side terminal block 150.

For example, the input-side neutral line area expansion unit 160 is designed to include a lower area expansion unit 161 made of a conductive material, in which the input-side terminal block 150 is accommodated and an upper area expansion unit 162 made of a conductive material, which is coupled to an upper portion of the lower area expansion unit 161 in which the input-side terminal block 150 is accommodated and is in electrical contact with the lower area expansion unit 161. Thus, the area of the input-side neutral line may be primarily expanded by the lower area expansion unit 161, and the area of the input-side neutral line may be additionally expanded by the upper area expansion unit 162.

Meanwhile, since a specific portion of the input-side neutral line area expansion unit 160 is designed to be in mechanical contact with the input-side neutral line connection part 151 made of a conductive material and the input-side neutral line area expansion unit 160 is in electrical contact with the input-side neutral line connection part 151, the area of the input-side neutral line may be expanded.

The neutral line area on the input side of the earth leakage circuit breaker 200 becomes greater than a phase voltage line due to the input-side neutral line area expansion unit 160 made of a conductive material, and thus the leakage current becomes much smaller. Further, as the leakage current becomes smaller, the risk of electric shock becomes smaller, and thus the risk of electric shock to the human body due to the leakage current can be minimized.

The reason for this, as disclosed in Korean Patent Registration No. 10-1625493 (published on May 30, 2016), is that the leakage current gradually decreases as the area of the flat plate-shaped conductor (corresponding to the input-side neutral line of the present disclosure) connected to a negative terminal becomes greater than an area of the flat plate-shaped conductor (corresponding to the input-side phase voltage line of the present disclosure) connected to a positive terminal of a power source.

In detail, a closed loop is not normally configured in a portion where an area is expanded by the input-side neutral line area expansion unit 160, but when the circuit breaker terminal box 100 having a leakage current blocking function is submerged in water due to flooding, the closed loop is configured.

When the circuit breaker terminal box 100 having a leakage current blocking function is submerged in water and the closed loop is thus configured, a current leaks through the input-side phase voltage line connection part 152, and the current flows through the input-side phase voltage line connection part 152, the water, the input-side neutral line area expansion unit 160, and the input-side neutral line connection part 151 in this order.

In this process, the current leaking through the input-side phase voltage line connection part 152 on the input side of the earth leakage circuit breaker 200 does not flow to the human body having a relatively very large resistance but flows to the input-side neutral line area expansion unit 160 through the water and is drawn into the input-side neutral line connection part 151. Thus, the flow of the leakage current to the human body is limited, and thus the risk of electric shock to the human body is minimized.

By this implementation, according to the present disclosure, the current leaking from the phase voltage line on the input side of the earth leakage circuit breaker 200 may be limited by expanding an area of the input-side neutral line on the input side of the earth leakage circuit breaker 200. Thus, the risk of electric shock to the human body due to the leakage current can be minimized.

Meanwhile, according to an additional aspect of the present disclosure, the circuit breaker terminal box 100 having a leakage current blocking function may further include an output side terminal block 170. The output side terminal block 170 electrically connects an output side phase voltage line (R line or T line or S line) (not illustrated) and the phase voltage line output terminal 240 on the output side of the earth leakage circuit breaker 200 and electrically connects an output side neutral line (N line) (not illustrated) and the neutral line output terminal 230 on the output side of the earth leakage circuit breaker 200.

For example, an output side neutral line connection part 171 made of a conductive material and an output side phase voltage line connection part 172 made of a conductive material are provided on one side of the output side terminal block 170, and a neutral line output terminal connection part 173 made of a conductive material and a phase voltage line output terminal connection part 174 made of a conductive material are provided on the other side of the output side terminal block 170. Thus, an output side neutral line may be electrically connected to the output side neutral line connection part 171, an output side phase voltage line may be electrically connected to the output side phase voltage line connection part 172, the neutral line output terminal 230 may be electrically connected to the neutral line output terminal connection part 173, and the phase voltage line output terminal 240 may be electrically connected to the phase voltage line output terminal connection part 174.

In this case, the circuit breaker terminal box 100 having a leakage current blocking function may further include an output side neutral line area expansion unit 180 made of a conductive material. The output side neutral line area expansion unit 180 limits a leakage current of the output side terminal block 170 by expanding an area of the output side neutral line connected to the output side terminal block 170.

For example, the output side neutral line area expansion unit 180 is designed to include a lower area expansion unit 181 made of a conductive material, in which the output side terminal block 170 is accommodated and an upper area expansion unit 182 made of a conductive material, which is coupled to an upper portion of the lower area expansion unit 181 in which the output side terminal block 170 is accommodated and is in electrical contact with the lower area expansion unit 181. Thus, the area of the input-side neutral line may be primarily expanded by the lower area expansion unit 181, and the area of the input-side neutral line may be additionally expanded by the upper area expansion unit 182.

Meanwhile, since a specific portion of the output side neutral line area expansion unit 180 is designed to be in mechanical contact with the output side neutral line connection part 171 made of a conductive material and the output side neutral line area expansion unit 180 is in electrical contact with the output side neutral line connection part 171, the area of the output side neutral line may be expanded.

The neutral line area on the output side of the earth leakage circuit breaker 200 becomes greater than the phase voltage line due to the output side neutral line area expansion unit 180 made of a conductive material, and thus the leakage current becomes much smaller. Further, as the leakage current becomes smaller, the risk of electric shock becomes smaller, and thus the risk of electric shock to the human body due to the leakage current can be minimized.

The reason for this, as disclosed in Korean Patent Registration No. 10-1625493 (published on May 30, 2016), is that the leakage current gradually decreases as the area of the flat plate-shaped conductor (corresponding to the output side neutral line of the present disclosure) connected to a negative terminal becomes greater than an area of the flat plate-shaped conductor (corresponding to the output side phase voltage line of the present disclosure) connected to a positive terminal of a power source.

In detail, a closed loop is not normally configured in a portion where an area is expanded by the output side neutral line area expansion unit 180, but when the circuit breaker terminal box 100 having a leakage current blocking function is submerged in water due to flooding, the closed loop is configured.

When the circuit breaker terminal box 100 having a leakage current blocking function is submerged in water and the closed loop is thus configured, a current leaks through the output side phase voltage line connection part 172, and the current flows through the output side phase voltage line connection part 172, the water, the output side neutral line area expansion unit 180, and the output side neutral line connection part 171 in this order.

In this process, the current leaking through the output side phase voltage line connection part 172 on the output side of the earth leakage circuit breaker 200 does not flow to the human body having a relatively very large resistance but flows to the output side neutral line area expansion unit 180 through the water and is drawn into the output side neutral line connection part 171. Thus, the flow of the leakage current to the human body is limited, and thus the risk of electric shock to the human body is minimized.

By this implementation, according to the present disclosure, the current leaking from the phase voltage line on the output side of the earth leakage circuit breaker 200 may be limited by expanding an area of the output side neutral line on the output side of the earth leakage circuit breaker 200. Thus, the risk of electric shock to the human body due to the leakage current can be minimized.

As described above, according to the present disclosure, the current leaking from both the input side and the output side of the earth leakage circuit breaker may be limited by expanding the areas of the neutral line input terminal and the neutral line output terminal on both the input side and the output side of the earth leakage circuit breaker, and thus the risk of electric shock to the human body due to the leakage current can be minimized. Thus, the purpose of the present disclosure presented above can be achieved.

According to the present disclosure, a current leaking from both an input side and an output side of an earth leakage circuit breaker can be limited by expanding areas of a neutral line input terminal and a neutral line output terminal on both the input side and the output side of the earth leakage circuit breaker. Thus, the risk of electric shock to the human body due to the leakage current can be minimized.

Various embodiments disclosed in the present specification and the drawings are merely presented as specific examples to help understanding and are not intended to limit the scope of various embodiments of the present disclosure.

Thus, it should be interpreted that the scope of various embodiments of the present disclosure includes all changes or modifications derived based on the technical spirit of various embodiments of the present disclosure in addition to the embodiments described herein.

What is claimed is:

1. A circuit breaker terminal box, the circuit breaker terminal box comprising:
    an earth leakage circuit breaker;
    a neutral line input terminal area expansion unit that is coupled to an input side of the earth leakage circuit breaker and is in electrical contact with a neutral line input terminal on the input side of the earth leakage circuit breaker to expand an area of the neutral line input terminal on the input side of the earth leakage circuit breaker so as to limit a leakage current on the input side of the earth leakage circuit breaker;
    a neutral line output terminal area expansion unit that is coupled to an output side of an earth leakage circuit breaker and is in electrical contact with a neutral line output terminal on the output side of the earth leakage circuit breaker to expand an area of the neutral line output terminal on the output side of the earth leakage circuit breaker so as to limit a leakage current on the output side of the earth leakage circuit breaker;
    a lower housing in which internal components including the earth leakage circuit breaker, the neutral line input terminal area expansion unit, and the neutral line output terminal area expansion unit are accommodated; and
    an upper housing coupled to an upper portion of the lower housing and configured to protect the internal components.

2. The circuit breaker terminal box of claim 1, further comprising:
    an input-side terminal block configured to electrically connect an input-side phase voltage line and a phase voltage line input terminal on the input side of the earth leakage circuit breaker and electrically connect an input-side neutral line and the neutral line input terminal on the input side of the earth leakage circuit breaker.

3. The circuit breaker terminal box of claim 2, further comprising:
    an input-side neutral line area expansion unit configured to limit a leakage current from the input-side terminal block by expanding an area of the input-side neutral line connected to the input-side terminal block.

4. The circuit breaker terminal box of claim 1, further comprising:
    an output side terminal block configured to electrically connect an output side phase voltage line and a phase voltage line output terminal on the output side of the earth leakage circuit breaker and electrically connect an output side neutral line and the neutral line output terminal on the output side of the earth leakage circuit breaker.

5. The circuit breaker terminal box of claim 4, further comprising:
    an output side neutral line area expansion unit configured to limit a leakage current from the output side terminal block by expanding an area of the output side neutral line connected to the output side terminal block.

* * * * *